(12) United States Patent
Xie et al.

(10) Patent No.: US 10,745,313 B2
(45) Date of Patent: Aug. 18, 2020

(54) METHOD FOR MICRO-GRINDING TIP-ACCURATELY INDUCED BRITTLE FRACTURE FORMING OF CURVED MIRROR SURFACE

(71) Applicant: SOUTH CHINA UNIVERSITY OF TECHNOLOGY, Guangdong (CN)

(72) Inventors: Jin Xie, Guangdong (CN); Long Zhang, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 0 days.

(21) Appl. No.: 16/340,388

(22) PCT Filed: Dec. 23, 2016

(86) PCT No.: PCT/CN2016/111601
§ 371 (c)(1),
(2) Date: Apr. 9, 2019

(87) PCT Pub. No.: WO2018/068398
PCT Pub. Date: Apr. 19, 2018

(65) Prior Publication Data
US 2020/0048135 A1    Feb. 13, 2020

(30) Foreign Application Priority Data
Oct. 10, 2016  (CN) .......................... 2016 1 0886300

(51) Int. Cl.
*C03B 33/04* (2006.01)
*C03B 33/033* (2006.01)
*C03B 33/10* (2006.01)

(52) U.S. Cl.
CPC ............ *C03B 33/04* (2013.01); *C03B 33/033* (2013.01); *C03B 33/10* (2013.01)

(58) Field of Classification Search
CPC ....... C03B 33/02; C03B 33/04; C03B 33/033; C03B 33/10; C03B 33/105–107
See application file for complete search history.

(56) References Cited

U.S. PATENT DOCUMENTS 3,567,086 A * 3/1971 Wark ................... B23D 31/002
                                                      225/2
3,800,991 A * 4/1974 Grove ................... C03B 33/033
                                                      225/2
(Continued)

FOREIGN PATENT DOCUMENTS

CN       101037291       9/2007
CN       101759355       6/2010
(Continued)

OTHER PUBLICATIONS

"International Search Report (Form PCT/ISA/210)", dated Jul. 10, 2017, with English translation thereof, pp. 1-4.

*Primary Examiner* — Erin Snelting
(74) *Attorney, Agent, or Firm* — JCIPRNET

(57) ABSTRACT

The present invention provides a method for micro-grinding tip-accurately induced brittle fracture forming of a curved mirror surface. The method includes the steps of: grinding a surface of an optical glass material by means of a V-shaped tip of a diamond grinding wheel to form a V-shaped microgroove having a groove micro-tip; setting two supporting points with a distance of L therebetween on one side of the optical glass material where the microgroove is machined, providing a loading pressing head having a horizontal deviation distance of l between a loading point and the groove micro-tip on the other side of the optical glass material, and allowing the loading pressing head to perpendicularly apply a loading force F onto the optical glass material with a loading speed of v, and forming a penetrated smooth curved mirror surface within 0.3 millisecond via the loading point (Continued)

of the loading force F and under induction of the groove micro-tip.

9 Claims, 5 Drawing Sheets

(56) References Cited

U.S. PATENT DOCUMENTS

| | | | | | |
|---|---|---|---|---|---|
| 3,865,293 | A | * | 2/1975 | Ernsberger | C03B 33/033 225/2 |
| 3,865,294 | A | * | 2/1975 | Ernsberger | C03B 33/033 225/2 |
| 3,865,673 | A | * | 2/1975 | DeTorre | C03B 33/033 428/43 |
| 4,046,300 | A | * | 9/1977 | Welker | C03B 33/04 225/103 |
| 4,057,184 | A | * | 11/1977 | Michalik | C03B 33/09 225/2 |
| 4,088,255 | A | * | 5/1978 | DeTorre | C03B 33/033 225/96.5 |
| 4,487,350 | A | * | 12/1984 | DeTorre | C03B 33/04 225/105 |
| 4,948,025 | A | * | 8/1990 | Lisec | C03B 33/033 225/104 |
| 5,381,713 | A | * | 1/1995 | Smith | C03B 33/027 83/582 |
| 5,836,229 | A | * | 11/1998 | Wakayama | B24B 3/08 83/886 |
| 2003/0145624 | A1 | * | 8/2003 | Luettgens | B28D 1/00 65/17.1 |
| 2007/0164072 | A1 | * | 7/2007 | Nishio | B28D 5/0011 225/93.5 |
| 2011/0084426 | A1 | * | 4/2011 | Nakamura | B28D 5/00 264/479 |
| 2012/0012632 | A1 | * | 1/2012 | Tominaga | B28D 1/24 225/2 |
| 2013/0140291 | A1 | * | 6/2013 | Zhuang | C03B 33/033 219/383 |
| 2014/0027951 | A1 | * | 1/2014 | Srinivas | B29C 59/16 425/174.4 |
| 2014/0239552 | A1 | * | 8/2014 | Srinivas | C03B 33/0222 264/5 |
| 2015/0340661 | A1 | * | 11/2015 | Sakamoto | C03C 15/02 438/28 |
| 2017/0113960 | A1 | * | 4/2017 | Soyama | B28D 1/225 |
| 2017/0183250 | A1 | * | 6/2017 | Soyama | B28D 1/225 |
| 2017/0217818 | A1 | * | 8/2017 | Dumenil | C03B 33/033 |
| 2017/0355634 | A1 | * | 12/2017 | Dumenil | C03B 33/04 |

FOREIGN PATENT DOCUMENTS

| | | | |
|---|---|---|---|
| CN | 105451844 | | 3/2016 |
| JP | H07223828 | | 8/1995 |
| JP | H08277137 | | 10/1996 |
| WO | WO-2005123356 A1 | * | 12/2005 ............ C03B 33/07 |
| WO | WO-2009118959 A1 | * | 10/2009 ........... C03B 33/033 |
| WO | WO-2013058201 A1 | * | 4/2013 ........ C03B 33/0215 |
| WO | 2016108007 | | 7/2016 |

* cited by examiner

METHOD FOR MICRO-GRINDING TIP-ACCURATELY INDUCED BRITTLE FRACTURE FORMING OF CURVED MIRROR SURFACE

CROSS-REFERENCE TO RELATED APPLICATION

This application is a 371 application of an international PCT application serial no. PCT/CN2016/111601, filed on Dec. 23, 2016, which claims priority to and the benefit of China Patent Application No. CN201610886300.3, filed on Oct. 10, 2016. The entirety of each of the above-mentioned patent applications is hereby incorporated by reference herein and made a part of this specification.

TECHNICAL FIELD

The present invention relates to the field of manufacture of optical glass curved surfaces, and in particular, relates to a diamond micro-tip micro-grinding method of a microgroove which is smooth without fracture damages. This is a forming method which is induced by micro crack and with nearly no removal of materials, and is a new manufacture technique in which external machining is not needed on an optical curved surface.

BACKGROUND

Displays, LED illuminations, light condensations, information transmissions and the like all need optical curved surfaces to improve system performance and reduce system energy consumption. Conventional optical curved surfaces are mainly machined by using expensive multi-axis computerized numerical control (CNC) precision machine tools. The machining needs many processes such as rough grinding, fine grinding, polishing and the like. Therefore, wear of the tools is severe, the CNC machine tools are difficult to control, and the processing efficiency is extremely low. In addition, a large quantity of emissions which are difficult to recycle is produced, while the cost is high, the efficiency is low and the cutting liquid is not environmentally friendly.

Therefore, micro-cracks are formed under induction of precise and smooth micro-grinding tips, and an optical curved surface is formed by controlling micro-crack expansion and brittle fracture forming, which is fast, low in cost and good in effect. In addition, a relevant mechanical model is established, which may be used to predict the force suffered during processing.

At present, cemented carbide and PCD cutter wheels are widely used to split glass, but the cutter has a limited life time. Therefore, a harder CVD diamond wheel is invented to replace the cemented carbide and PCD cutter wheel. However, cutting the glass with a cutter wheel inevitably causes damages to edges and unevenness of the cross section. Cutting glass using an ultrasonic vibration assisted diamond cutter wheel for scribing could increase the longitudinal depth of the micro-crack and is thus favorable to cutting of the glass. However, the damages on the edges and unevenness of the cross section are still not solved, and further grinding is still needed.

Although scribing using the diamond plus irradiating along the microgroove using laser is favorable cutting of the glass, the damages on the edges are still not addressed, and additionally an oblique cross section is produced. Scribing the glass using laser irradiation and irradiating micro-marks may achieve the purpose of splitting the glass. However, edge damages and burrs are unavoidable, and thermal damages are present in the cross section. As such, the cross section still needs further treatments.

Laser and chemical corrosion may be used for machining of the micro-tips of the hard and brittle materials. However, the machining depth is less than 7.5 μm and the surface of the microgroove is irregular and rough. The micro-tip of the diamond wheel is used to machine micro-grooves which are precise and smooth.

Precise and smooth micro-grinding tip-induced cutting of the optical materials requires no additional procedures, and may complete precise and mirror machining at one time.

SUMMARY

To overcome the defects in the above prior art, the present invention provides a method for micro-grinding tip-accurately induced brittle fracture forming of a curved mirror surface. The present invention provides micro-grinding a microgroove by using a micro-tip of a diamond grinding wheel, and obtaining an optical curved surfaced by microcrack induced brittle forming. The present invention is intended to solve the problems that microgroove edges are damaged by rolling and laser etching and the efficiency of the find grinding and polishing processes is low, and implement brittle fracture manufacturing of the glass curved mirror surfaces with no pollution, high efficiency and low cost.

The present invention employs the following technical solution.

A method for micro-grinding tip-accurately induced brittle fracture forming of a curved mirror surface, comprises: grinding a surface of an optical glass material in a rectangle plate by means of a V-shaped tip of a diamond grinding wheel to form a V-shaped microgroove having a groove micro-tip; and setting two supporting points with a distance of L therebetween on one side of the optical glass material where the V-shaped microgroove is machined, providing a loading pressing head having a horizontal deviation distance of l between a loading point and the groove micro-tip on the other side of the optical glass material, and allowing the loading pressing head to perpendicularly apply a loading force F onto the optical glass material at a loading speed of v, and forming a penetrated smooth curved surface via the loading point of the loading force F and under induction of the groove micro-tip.

Further, the loading force F is:

$$F = \frac{22.1B(W-h_v)^2(0.3333r_v + 0.0104)^{0.4552}}{Lr_v^{0.4552}\left(1 + 0.54\left(1 + \frac{0.0104}{0.3333r_v}\right)^{-0.8897}\right)},$$

wherein B represents a workpiece width, W represents a workpiece thickness, $h_v$ represents a microgroove depth, $r_v$ represents a groove tip radius, and L represents a supporting point distance.

Further, the loading speed v is less than 50 mm/min.

Further, the V-shaped microgroove has an included angle of 60° to 120°.

Further, when an included angle θ formed between a central line of the V-shaped microgroove and the surface of the optical glass material is 90°, if the horizontal deviation distance l between the loading point of the loading pressing head and the groove micro-tip is equal to the workpiece thickness W, a convex circular arc-shaped curved surface with a radius R of the workpiece thickness is formed; and if the horizontal deviation distance l between the loading point and the groove micro-tip is less than the workpiece thickness W, a convex circular arc-shaped curved surface with a radius $$R = \frac{W^2}{2l}$$

is formed.

Further, when an included angle θ formed between a central line of the V-shaped microgroove and the surface of the optical glass material is less than 90° and an intersection between the central line and a plane where the loading point of the optical glass material is located is at a to-be-stripped portion of the optical glass material, if the horizontal deviation distance $$l = \frac{1+\cos\theta}{\sin\theta}W,$$

a convex circular arc-shaped curved surface with a radius $$R = \frac{2W\cos^2\theta + W\cos\theta}{\sin^2\theta}$$

is formed, and if the horizontal deviation distance $$l < \frac{1+\cos\theta}{\sin\theta}W,$$

a convex circular arc-shaped curved surface with a radius $$R = \frac{\sqrt{l^2+W^2}}{2\sin\arccos\frac{W^2(\sin^2\theta+\sin^4\theta)+\cos^2\theta(2\sin^2\theta+W\cos^4\theta)}{2W\sqrt{l^2+W^2}\sin^3\theta}} \text{ is formed.}$$

Further, when an included angle θ formed between a central line of the V-shaped microgroove and the surface of the optical glass material is less than 90° and the central line passes through the loading point, an oblique planar smooth curved surface through brittle fractured along a line of symmetry is formed.

Further, when an included angle θ formed between a central line of the V-shaped microgroove and the surface of the optical glass material is less than 90° and an intersection between the central line and a plane where the loading point of the optical glass material is located is at a to-be-shaped portion of the optical glass material, a concave circular arc-shaped curved surface with a radius R=l+W tan θ is obtained.

Further, materials of the workpiece material include optical glass, ceramic or sapphire.

As compared against the prior art, the present invention achieves the following beneficial effects: damages of microgroove edges caused by rolling and laser etching and unevenness of the cutting face are prevented, the curved mirror surface is precisely formed without grinding with a high-precision five-axis machine tool having large consumption, a cutting face having a high precision and a low surface roughness is obtained, with an average shape precision reaching 8.8 μm/mm and an average surface roughness is $R_a$=13.7 nm.

Figure 1:
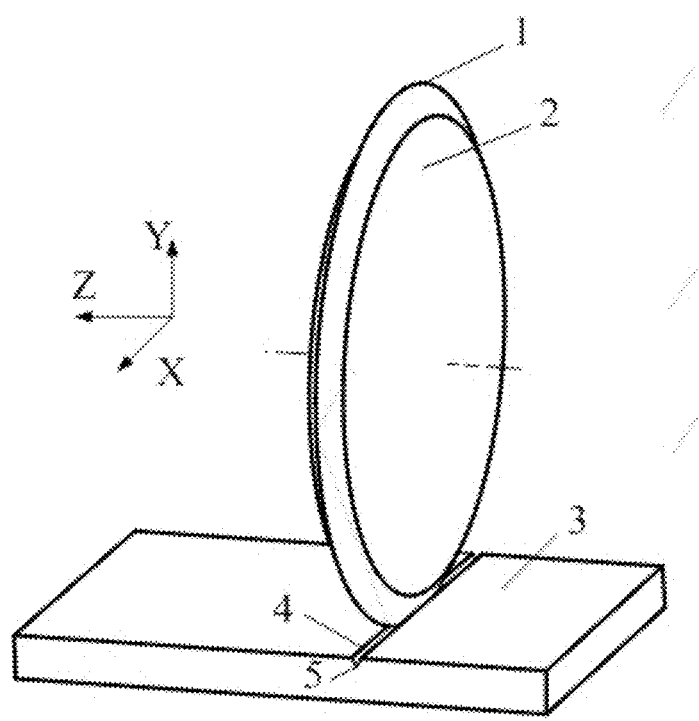
FIG. 1 is a schematic diagram of principles of microgroove grinding on an optical glass material.

Reference numerals and denotations thereof:
1—Grinding wheel micro-tip;
2—Diamond grinding wheel;
3—Optical glass material;
31—To-be-stripped portion;
32—To-be-shaped portion;
4—V-shaped microgroove;
5—Groove micro-tip;
6—Loading pressing head;
7—Smooth curved surface; and
8—Loading point.

DETAILED DESCRIPTION

For better understanding of the present invention, the present invention is further described in detail with reference to accompanying drawings and specific embodiments. However, the scope of protection of the present invention is not limited to the scope defined by these embodiments.

Figure 2:
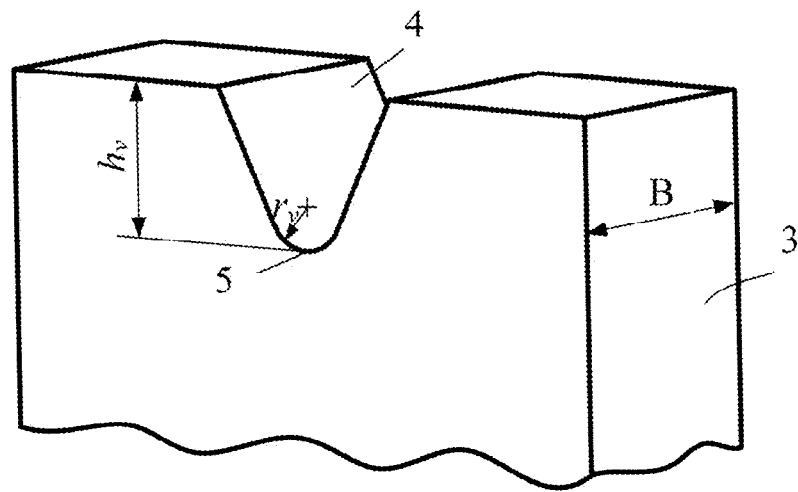
FIG. 2 is a partial enlarged view of the microgroove of FIG. 1.
Figure 3:
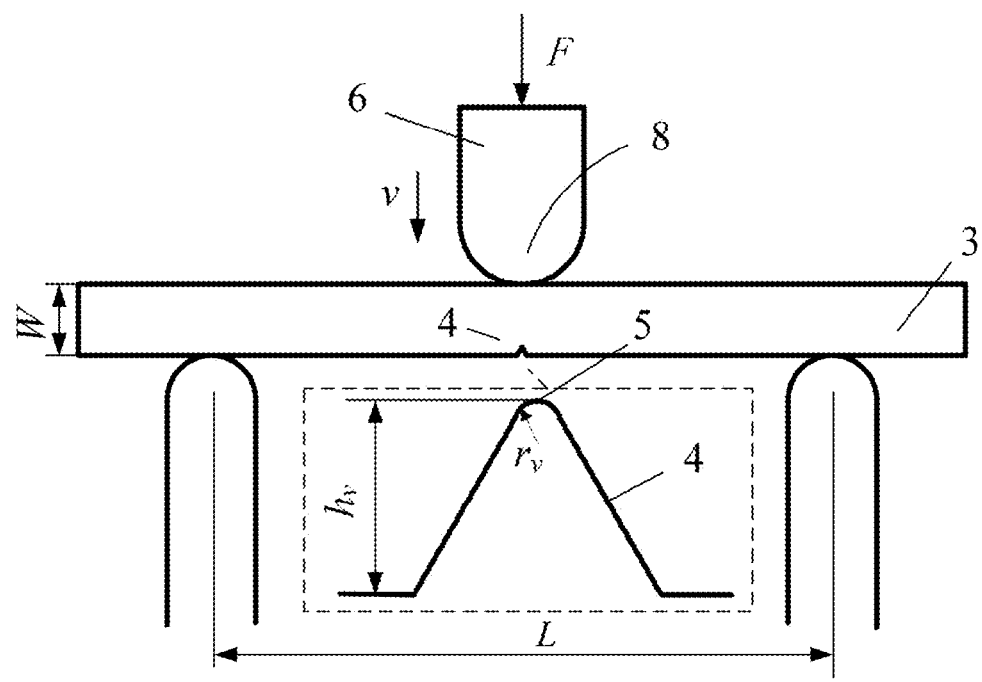
FIG. 3 is a schematic diagram of principles of micro-tip-accurately induced brittle fracture forming.
Figure 4:
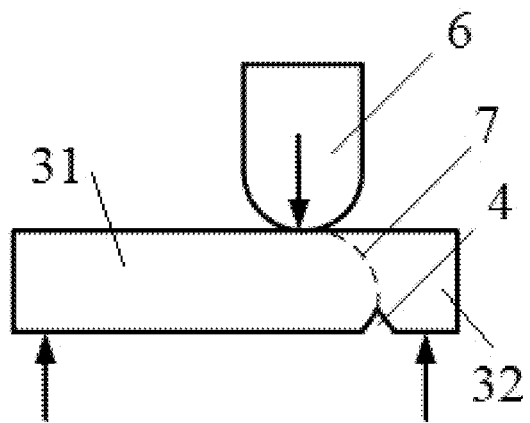
FIG. 4 is a schematic diagram of micro-tip-accurately induced brittle fracture forming.

Referring to FIG. 1 and FIG. 2, a method for micro-grinding tip-accurately induced brittle fracture forming of a curved mirror surface, comprises:

grinding a surface of an optical glass material 3 by means of a V-shaped tip of a diamond grinding wheel to form a V-shaped microgroove 4 having a groove micro-tip 5 (as illustrated in FIG. 1); and as shown in FIG. 3, setting two supporting points with a distance of L therebetween on one side of the optical glass material 3 where the V-shaped microgroove 4 is machined, providing a loading pressing head 6 having a horizontal deviation distance of l between a loading point 8 and the groove micro-tip 5 on the other side of the optical glass material 3, and allowing the loading pressing head 6 to perpendicularly apply a loading force F onto the optical glass material 3 at a loading speed of v, and forming a penetrated smooth curved surface 7 (as shown in FIG. 4)

within 0.3 millisecond via the loading point 8 of the loading force F and under induction of the groove micro-tip 5.

Specifically, the loading force F is:

$$F = \frac{22.1B(W-h_v)^2(0.3333r_v + 0.0104)^{0.4552}}{Lr_v^{0.4552}\left(1 + 0.54\left(1 + \frac{0.0104}{0.3333r_v}\right)^{-0.8897}\right)},$$

wherein B represents a workpiece width, W represents a workpiece thickness, $h_v$ represents a microgroove depth, $r_v$ represents a groove tip radius, and L represents a supporting point distance.

Specifically, the loading speed v is less than 50 mm/min.

Specifically, the V-shaped microgroove has an included angle of 60° to 120°.

In another embodiment of the present invention, when an included angle θ formed between a central line of the V-shaped microgroove 4 and the surface of the optical glass material 3 is 90°, if the horizontal deviation distance l between the loading point 8 of the loading pressing head 6 and the groove micro-tip 5 is equal to the workpiece thickness W, a convex circular arc-shaped curved surface 7 with a radius R of the workpiece thickness is formed; and if the horizontal deviation distance l between the loading point 8 and the groove micro-tip 5 is less than the workpiece thickness W, a convex circular arc-shaped curved surface 7 with a radius $$R = \frac{W^2}{2l}$$

is formed.

In another embodiment of the present invention, when an included angle θ formed between a central line of the V-shaped microgroove 4 and the surface of the optical glass material 3 is less than 90° and an intersection between the central line and a plane where the loading point 8 of the optical glass material 3 is located is at a to-be-stripped portion 32 of the optical glass material 3, if the horizontal deviation distance $$l = \frac{1+\cos\theta}{\sin\theta}W,$$

a convex circular arc-shaped curved surface 7 with a radius $$R = \frac{2W\cos^2\theta + W\cos\theta}{\sin^2\theta}$$

is formed, and if the horizontal deviation distance $$l < \frac{1+\cos\theta}{\sin\theta}W,$$

a convex circular arc-shaped curved surface 7 with a radius $$R = \frac{\sqrt{l^2+W^2}}{2\sin\arccos\frac{W^2(\sin^2\theta+\sin^4\theta)+\cos^2\theta(2\sin^2\theta+W\cos^4\theta)}{2W\sqrt{l^2+W^2}\sin^3\theta}}$$ is formed.

In another embodiment of the present invention, when an included angle θ formed between a central line of the V-shaped microgroove 4 and the surface of the optical glass material 3 is less than 90° and the central line passes through the loading point 8, an oblique planar smooth curved surface 7 brittle fractured along a line of symmetry is formed.

In another embodiment of the present invention, when an included angle θ formed between a central line of the V-shaped microgroove 4 and the surface of the optical glass material 3 is less than 90° and an intersection between the central line and a plane where the loading point 8 of the optical glass material 3 is located is at a to-be-shaped portion 31 of the optical glass material 3, a concave circular arc-shaped curved surface 7 with a radius $R = l + W\tan\theta$ is obtained.

Specifically, materials of the workpiece material 3 include optical glass, ceramic or sapphire.

Figure 5:
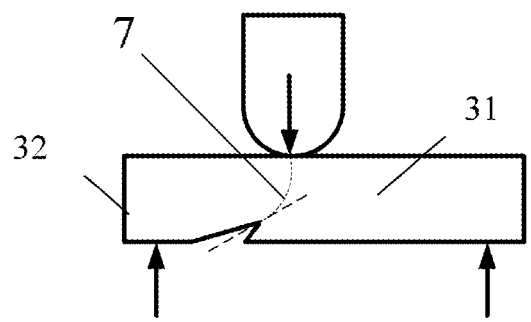
FIG. 5 is another schematic diagram of micro-tip-accurately induced brittle fracture forming.
Figure 6:
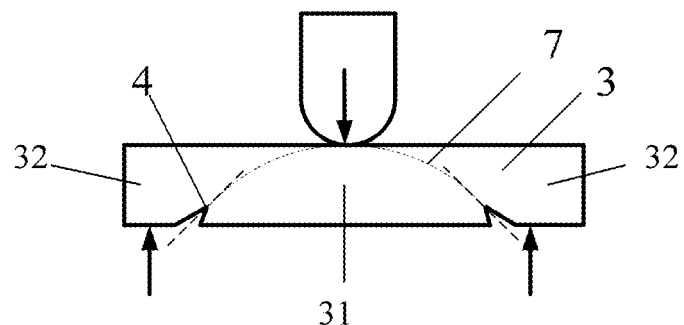
FIG. 6 is another schematic diagram of micro-tip-accurately induced brittle fracture forming.
Figure 7:
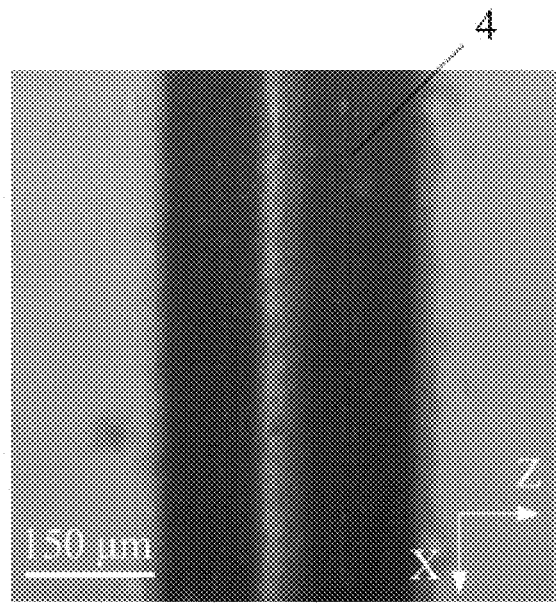
FIG. 7 is an electron microscopy image of a surface morphology of a micro-crack-induced brittle fracture cutting surface in an XZ plane.
Figure 8:
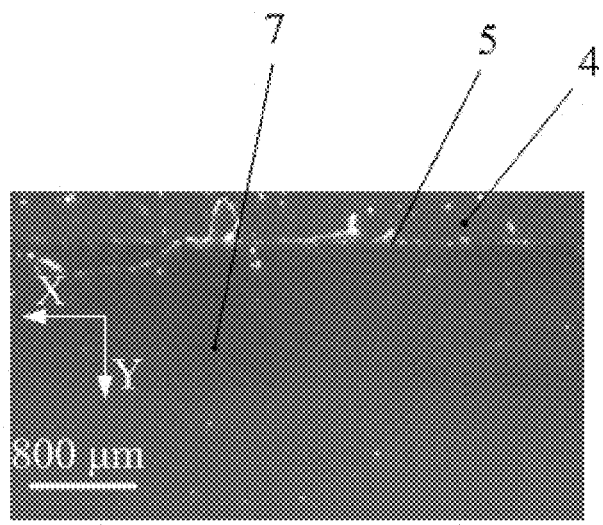
FIG. 8 is an electron microscopy image of a surface morphology of a micro-crack-induced brittle fracture cutting surface in an XY plane.
Figure 9:
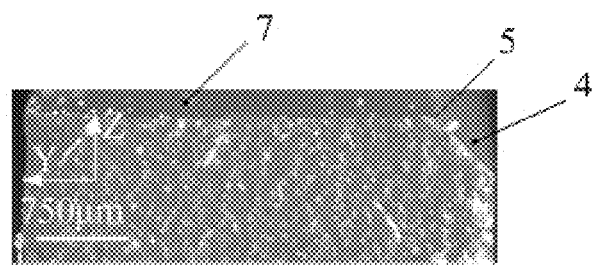
FIG. 9 is an electron microscopy image of a surface morphology of a micro-crack-induced brittle fracture cutting surface in a YZ plane.
Figure 10:
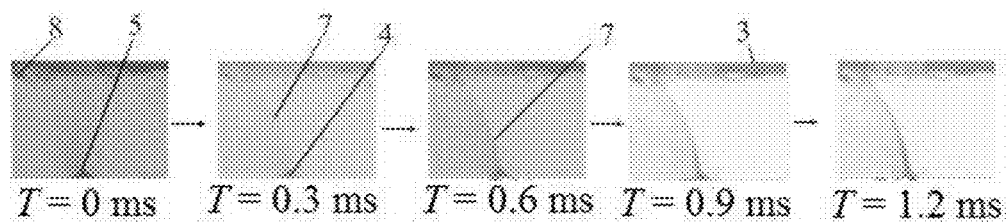
FIG. 10 is a schematic diagram of a process of the micro-tip-accurately induced brittle fracture forming.

As illustrated in FIG. 1 and FIG. 2, during the machining of the V-shaped microgroove 4, the precise and smooth V-shaped microgroove 4 and the groove micro-tip 5 are formed by grinding the optical glass material 3 by using a grinding wheel micro-tip 1 of a diamond grinding wheel 2, thus to obtain an optical glass material having a precise and smooth microgroove with no damage. Afterwards, the optical glass material with the microgroove is used for accurately-induced brittle fracture forming by the groove micro-tip 5. As illustrated in FIG. 4 to FIG. 6, the V-shaped microgroove 4 is disposed on an opposite side against the loading pressing head 6, and loading is performed by controlling a loading speed of the loading pressing head 6. With the loading reaching a critical condition, the optical glass material 3 starts fracturing from the V-shaped microgroove 4, the crack extends along the cutting face and forms a desired smooth curved surface 7 by brittle fracture. The curvature of the smooth curved surface 7 is controlled by controlling the loading point 8 of the loading pressing head 6, and the cutting force may be controlled by adjusting the support distance L when the V-shaped microgroove 4 has a constant structure. FIG. 6 to FIG. 9 illustrate practical diagrams of the V-shaped microgroove 4 and the smooth curved surface 7, wherein the mirror surface is achieved. The micro-tip-accurately-induced brittle fracture forming is finished in a millisecond level, and thus a high efficiency is achieved. The process of the accurately-induced brittle fracture forming is as illustrated in FIG. 10.

In another embodiment, a 600# metal bonded diamond grinding wheel is dressed by using a CNC precision grinder machine (SMART B818) to obtain a micro-tip. The grinding wheel has a diameter of 150 mm, a thickness of 4 mm, a dressing feed speed of 500 mm/minute, and a cutting depth of 20 μm. The workpiece material 3 is quartz optical glass, with a geometrical dimension of 120 mm (length)×40 mm (width)×4 mm (height) and a microgroove machining depth of 500 μm. The axial line of the grinding wheel is parallel to the direction of the length side of the workpiece. The grinding wheel has a rotation speed of 2400 rpm, a micro-grinding feed speed of 500 mm/minute, and a micro-grinding cutting depth of 20 μm. Micro-crack-induced brittle fracture forming is carried out by using a WDW-05 tester, with the loading speeds of 5 mm/minute, 10 mm/minute, 20 mm/minute, 60 mm/minute, 100 mm/minute, 200 mm/minute and 300 mm/minute. The support distance is 35 mm, and the deviation distance is 1.5 mm. A high-speed camera is employed to record the time elapsed for micro-crack-induced brittle fracture forming.

Afterwards, the shape precision and the surface roughness of the cutting face are detected by using a TALYSURF CLI 1000 profiler. The detection results indicate that the shape precision reaches 8.8 μm/mm, and the surface roughness is $R_a$=13.7 nm. The time elapsed for brittle fracture forming is within 0.3 ms, and the formed arc radius is 6.74 mm.

In summary, the above method mainly includes two steps of grinding the microgroove and the micro-tip-accurately-induced brittle fracture forming. Specifically, grinding the microgroove is mainly intended to accurately obtain the desired micro-V-shaped tip with the diamond grinding wheel micro-tip. Firstly, the V-shaped tip of the diamond grinding wheel is dressed by using a digitally controlled grinding machine. Secondly, the precise and smooth microgroove with a desired trajectory is formed by grinding the surface of the hard and brittle material by using the micro-tip. The critical factors in the micro-tip-accurately-induced brittle fracture forming are the loading speed and the loading point. A desired curved mirror surface is obtained by the micro-tip-accurately-induced brittle fracture forming at designated different loading speeds and loading points.

The brittle fracture forming method of the curved mirror surface in the above embodiment does not need any cooling liquid and polishing liquid, the brittle fracture forming is finished within or less than 0.3 millisecond, wherein along the direction of the microgroove and along the loading direction, the shape precisions are 0.8 μm/mm and 31.7 μm/mm, and the surface roughnesses are 13.7 nm and 29.6 nm, respectively. 2.5D and 3D glass curved surfaces are machined by means of controlling the position of the applied force and the position of the microgroove tip and the value of the applied force. The applied force for brittle fracture may be predicted based on the radius, depth, angle and the like of the microgroove tip.

What is claimed is:

1. A method for grinding tip-accurately induced brittle fracture forming of a curved mirror surface, comprising:
    grinding a surface of a workpiece, which is a rectangle plate, by means of a V-shaped tip of a diamond grinding wheel to form a V-shaped groove having a groove tip; and
    setting two supporting points with a distance of L therebetween on one side of the workpiece where the V-shaped groove is machined, providing a loading pressing head having a horizontal deviation distance of 1 between a loading point and the groove tip on the other side of the workpiece, and allowing the loading pressing head to perpendicularly apply a loading force F onto the workpiece at a loading speed of v, and forming a penetrated smooth curved surface via the loading point of the loading force F and under induction of the groove tip,
    wherein the loading force F is:

$$F = \frac{22.1B(W - h_v)^2(0.3333r_v + 0.0104)^{0.4552}}{Lr_v^{0.4552}\left(1 + 0.54\left(1 + \frac{0.0104}{0.3333r_v}\right)^{-0.8897}\right)},$$

wherein B represents a workpiece width parallel to a longitudinal direction of the V-shaped groove, W represents a workpiece thickness parallel to a direction of the loading force, $h_v$ represents a groove depth, $r_v$ represents a groove tip radius, and L represents a supporting point distance.

2. The method for grinding tip-accurately induced brittle fracture forming of a curved mirror surface according to claim 1, wherein the loading speed v is less than 50 mm/min.

3. The method for grinding tip-accurately induced brittle fracture forming of a curved mirror surface according to claim 2, wherein when an included angle θ formed between a central line of the V-shaped groove and the surface of the workpiece is 90°, if the horizontal deviation distance 1 between the loading point of the loading pressing head and the groove tip is equal to the workpiece thickness W, a convex circular arc-shaped curved surface with a radius R of the workpiece thickness is formed; and if the horizontal deviation distance 1 between the loading point and the groove tip is less than the workpiece thickness W, a convex circular arc-shaped curved surface with a radius $$R = \frac{W^2}{2l}$$

is formed.

4. The method for grinding tip-accurately induced brittle fracture forming of a curved mirror surface according to claim 2, wherein when an included angle θ formed between a central line of the V-shaped groove and the surface of the workpiece is less than 90° and an intersection between the central line and a plane where the loading point of the workpiece is located is at a to-be-stripped portion of the workpiece, if the horizontal deviation distance $$l = \frac{1 + \cos\theta}{\sin\theta}W,$$

a convex circular arc-shaped curved surface with a radius $$R = \frac{2W\cos^2\theta + W\cos\theta}{\sin^2\theta}$$

is formed, and if the horizontal deviation distance $$l < \frac{1 + \cos\theta}{\sin\theta}W,$$

a convex circular arc-shaped curved surface with a radius $$R = \frac{\sqrt{l^2 + W^2}}{2\sin\arccos\frac{W^2(\sin^2\theta + \sin^4\theta) + \cos^2\theta(2\sin^2\theta + W\cos^4\theta)}{2W\sqrt{l^2 + W^2}\sin^3\theta}}$$

is formed.

5. The method for grinding tip-accurately induced brittle fracture forming of a curved mirror surface according to claim 2, wherein when an included angle θ formed between a central line of the V-shaped groove and the surface of the workpiece is less than 90° and the central line passes through the loading point, an oblique planar smooth curved surface brittle fractured along a line of symmetry is formed.

6. The method for grinding tip-accurately induced brittle fracture forming of a curved mirror surface according to claim 2, wherein when an included angle θ formed between a central line of the V-shaped groove and the surface of the workpiece is less than 90° and an intersection between the central line and a plane where the loading point of the workpiece is located is at a to-be-shaped portion of the workpiece, a concave circular arc-shaped curved surface with a radius R=l+W tan θ is obtained.

7. The method for grinding tip-accurately induced brittle fracture forming of a curved mirror surface according to claim 1, wherein the V-shaped groove has an included angle of 60° to 120°.

8. The method for grinding tip-accurately induced brittle fracture forming of a curved mirror surface according to claim 1, wherein the diamond grinding wheel has a cutting depth of 20 μm.

9. The method for grinding tip-accurately induced brittle fracture forming of a curved mirror surface according to claim 1, wherein a depth of the V-shaped groove is 500 μm.

* * * * *